United States Patent
Abraham

[19]

[11] Patent Number: 5,841,374

[45] Date of Patent: Nov. 24, 1998

[54] MICRO WORD-PAD WITH TACTILE MULTIFUNCTIONAL KEYS

[76] Inventor: Joseph N. Abraham, 515 Roosevelt, Lafayette, La. 70503

[21] Appl. No.: 790,047

[22] Filed: Jan. 28, 1997

[51] Int. Cl.[6] .................................................. H03M 11/00
[52] U.S. Cl. .................................. 341/34; 341/22; 341/23
[58] Field of Search ................................. 341/34, 22, 23; 345/156, 168

[56] References Cited

U.S. PATENT DOCUMENTS

| | | | |
|---|---|---|---|
| 4,442,506 | 4/1984 | Endfield | 364/900 |
| 4,913,573 | 4/1990 | Retter | 400/489 |
| 5,128,672 | 7/1992 | Kaehler | 341/23 |
| 5,186,555 | 2/1993 | Chiba . | |
| 5,278,779 | 1/1994 | Conway et al. | 364/708.1 |
| 5,457,453 | 10/1995 | Chiu et al. . | |
| 5,500,643 | 3/1996 | Grant | 341/22 |
| 5,528,235 | 6/1996 | Lin et al. | 341/22 |
| 5,627,566 | 5/1997 | Litschel | 345/108 |

Primary Examiner—Jeffrey A. Gaffin
Assistant Examiner—Jason L W Kost
Attorney, Agent, or Firm—Robert Montgomery

[57] ABSTRACT

An improved key and keyboard arrangement for a compact word processor, the keyboard arrangement consisting of only twelve toggle keys with each key capable of seven functions, six of the keys being operated in a tactile manner by the finger tips of each hand. Additional keys are provided along a vertical edge adjacent to the twelve keys for operation by the users thumbs. A second embodiment includes a pair of similar keyboards hinged together, each keyboard having a single row of six toggle keys movable in six directions and a center depressable function, and a plurality of keys perpendicular to the six toggle keys located along a vertical edge adjacent to the six toggle keys, each of the six toggle keys having seven functions operated by tactile manipulation. The six toggle keys on each keyboard portion and the associated perpendicular keys represent all of the functions of one half of a standard QWERTY computer keyboard.

16 Claims, 7 Drawing Sheets

MICRO WORD-PAD WITH TACTILE MULTIFUNCTIONAL KEYS

BACKGROUND OF THE INVENTION

1. Field of the Invention

The present invention relates to micro word processors in general and more particular to a pocket type or fold-up pocket used for rapid data word processing through multi-functional keys operated tactilely without the use of mapping or modifier keys other than those normally used by most computer keyboard.

2. General Background

Miniaturization has led to the development of electronic devices, such as cell phones, pocket calculators and organizers, which can be easily carried in one's pocket or purse. Such miniaturization has also led to the further development of very small micro word processors used for rapid data entry which can be translated and recorded at a later time or at a remote site computer. However, most such small micro word processors have been limited to keyboard arrangements having very small typing keys or a limited number of keys used in a single contact mode with a means for modifying the key's function. Most such keyboard arrangements are designed for one hand operation utilizing specialty key functions. However, keyboards have been developed, such as that disclosed in U.S. Pat. No. 5,186,555, wherein a multifunctional key is utilized, thus allowing a single key to take the place of multiple keys on a standard typing keyboard. Although utilizing multifunctional keys, this keyboard still has twenty-six keys, does not utilize the QWERTY configuration, is designed for one hand operation, and which, when coupled in some manner to a display, makes it bulky and unfit as a pocket computer.

To make a microcomputer as compact as possible it is necessary to reduce the number of keys or fold the computer in some manner, such as that disclosed by U.S. Pat. 5,457,453. However, the twenty-six key keypad's size restricts the down-sizing of such micro wordcomputers.

Therefore, there is a need for a smaller microcomputer that can be easily carried in one's pocket and which allows for rapid data entry with both hands in a manner similar to that used with a standard key pad. There is a further need to reduce the size of a keyboard by limiting the number of keys to less than twenty while retaining the same characters and functions as that of the standard 104 computer keyboard without the use of mapping or modifiers.

SUMMARY OF THE PRESENT INVENTION

The present invention combines the current technology of folding a micro wordcomputer and the reduction of keyboard size by reducing the number of keys required for full data entry. The combination is achieved without the use of mapping or modifying keys other than that used by a standard computer keyboard. A micro word computer is herein disclosed which may be constructed in one relatively small, unitized piece capable of being carried in one's pocket or purse or as two modular portions which may be folded into a very compact unit. Such compactness is achieved as a result of reducing the key board to only six keys on the face of each keypad portion and a maximum of four keys along each edge, adjacent to the six face keys. One keypad face portion is provided with a display. Each key utilizes multidirectional switching with up to seven functions. Switches along the edges of the modular portions provide a unique feature which allows the user to utilize the user's thumbs in a natural, ergonomic manner.

The operator uses a sense of touch on six keys with each hand, each key having multidirectional modes so as to allow each key to be directed to six directional switches plus a press down position for a total of seven functions. The thumb of each of the user's hands are utilized to manipulate up to four keys as required, thus reducing the number of keys to a maximum of twenty, including the auxiliary keys. A key arrangement is provided whereby all keys are in a single row, thus allowing the operator to maintain contact with four keys with each hand at all times. The operator then uses the forefinger and little finger of each hand respectively, to operate one key to the left and right of the initial four base keys. The unique seven position key switch configuration utilizes a multiplicity of simple membrane toggle switches combined into a single key whereby each of the six toggles are displaced tactilely by each finger tip, with a seventh position provided by a center key depression. A second embodiment utilizes a spring centered, single toggle which is manipulated directionally to six switch positions by the operator's finger tips, with a seventh position activated by depression of the key.

It is therefore an object of the present invention to provide a compact, pocket computer for word processing utilizing keys which combine a plurality of toggle switches or multidirectional keys in a pocket size case.

A further object is to provide a unique keyboard operability.

Yet another object of the invention is to provide an improved keyboard, the keys thereof being more ergonomic, by utilizing the thumbs to operate some keys located along the edges of the keyboard.

Still another object is to provide a full service keyboard for word processing having less than twenty keys and whereby such keys combine both directional and push down modes.

BRIEF DESCRIPTION OF THE DRAWINGS:

For a further understanding of the nature and objects of the present invention, reference should be made to the following detailed description, taken in conjunction with the accompanying drawings, in which like parts are given like reference numerals, and wherein.

DESCRIPTION OF THE PREFERRED EMBODIMENT

Figures 1, 2:
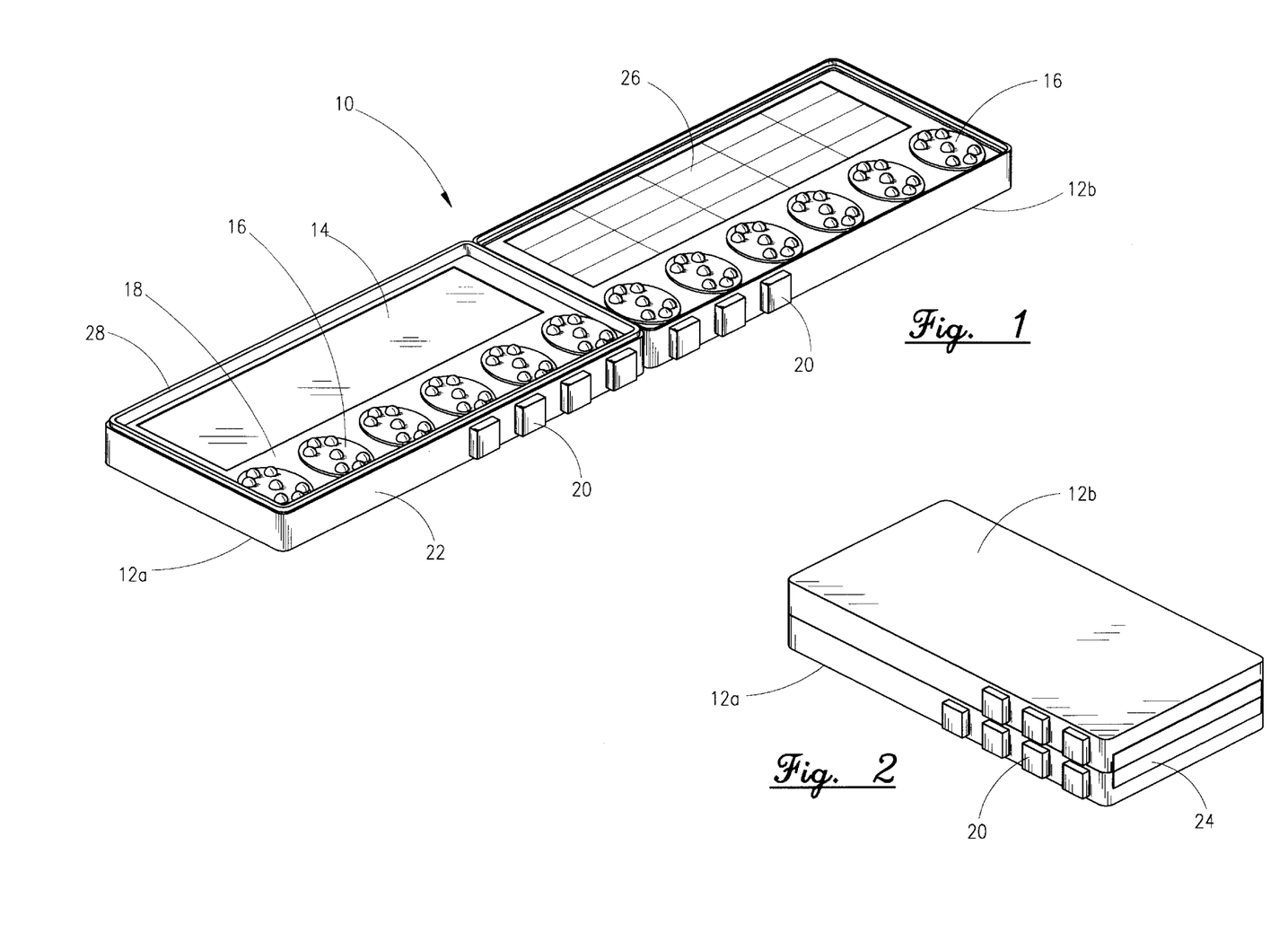
FIG. 1 is an isometric view of the first embodiment of the pocket computer in the open position.
FIG. 2 is an isometric view of the pocket computer in the closed position.

The compact, word processor, computer keyboard 10 as first illustrated in FIG. 1 is comprised of two keypads 12a, 12b. The first, or left keypad 12a, is comprised of an LCD 14, six finger keys on its face 18 and thumb keys 20 located along its edge. The second keypad 12b is connected to the first key pad by a hinge 24, shown first in FIG. 2, located along the ends of the two keypads 12a, 12b. The second keypad 12b also has six keys 16 on its face and thumb keys 20 located along its edge 22. A menu, or information chart, space 26 is provided on the second keypad.

Figure 6:
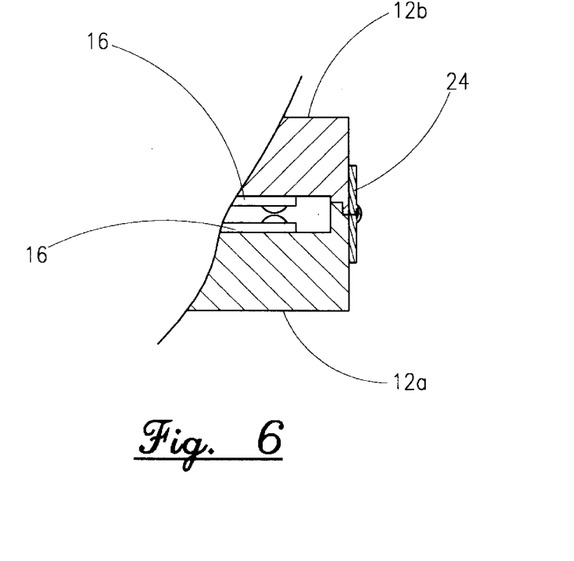
FIG. 6 is partial cross section view of the pocket computer in the folded or closed position shown in FIG. 2, taken across the hinge line, showing the toggled key spacing.

When folded, the keypads 12a, 12b as shown in FIG. 2, make a compact pocket size configuration. A raised ledge 28 is provided around the perimeter of each keypad face, serving as a spacer, thus preventing contact of the keys 16 when the keypads 12a, 12b are closed as shown in FIG. 6.

Figure 3:
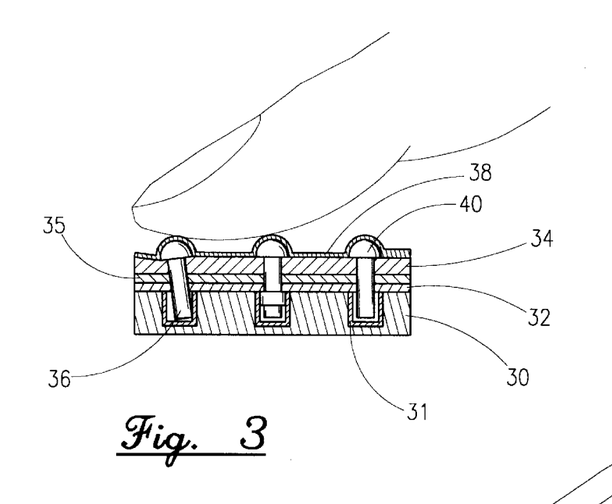
FIG. 3 is a vertical cross section view of the first key embodiment showing the uppermost toggle function activated.
Figure 4:
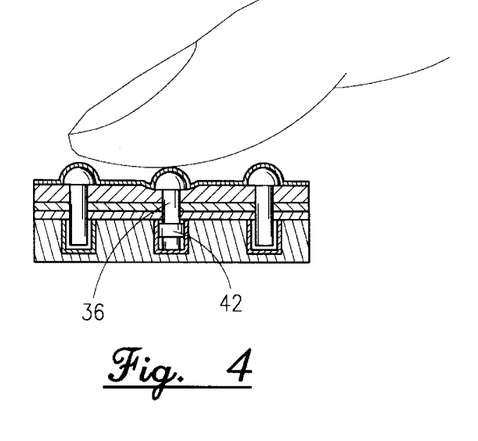
FIG. 4 is a vertical cross section view of the first key embodiment showing the center function activated.

The preferred, or first, embodiment illustrated in FIG. 1 incorporates a toggle key arrangement 16 further depicted in cross section in FIG. 3. This key arrangement 16 illustrates a set of seven independent toggle switches arranged in an oval or elliptical pattern whereby three switches are located at each end of the oval with the seventh switch located in the center. As seen in cross section in FIG. 3, each of the seven toggle switches comprising each key 16 is operated by a single finger tip in a tactile manner. Each key 16 and its seven toggle switches are comprised of a composite layering, further comprising a base layer 30 having a printed circuit-board which contains conductive sockets 31 connected therein; a rigid insulated layer 32 covering the conductive sockets 30 and printed circuit board 32; a conductive layer 35 adjacent the insulation layer; a flexible layer 34 adjacent the rigid conductive layer 35; conductive pins 36 having heads at one end inserted perpendicularly through the flexible layer 34 in a manner whereby said heads are opposite said conductive layer 35 with the pins being held in non-conductive suspension inside the conductive sockets 31; and a pliable membrane 38, covering the heads 40 of pins 36 thereby forming perceptible bumps. As readily seen in FIG. 3, pressure by the users finger tip displaces the pin 36 pivotally about the rigid layers 32, thus allowing contact between the pin 36 and the conductive sockets 31. With the rigid layers being conductive circuit boards, electrical contact can be achieved between the rigid layers 32, and the sockets 31. The center pin 36, or toggle seven located in the center of the oval arrangement is treated somewhat differently in that an insulating ring 42 as seen in FIG. 4 is used to prevent toggling of the pin accidentally. Therefore, to activate this pin the user must depress the pin 36 in purposeful manner.

Figure 5:
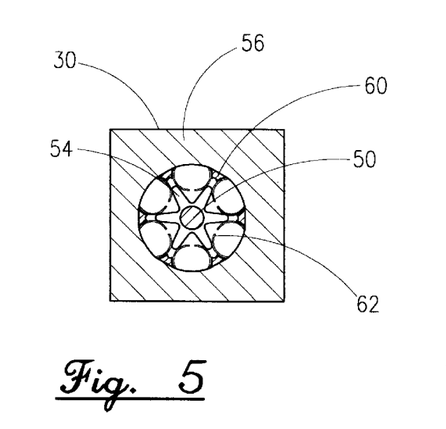
FIG. 5 is a top cross section view of the second key embodiment taken along sight line 55 in FIG. 7, showing the toggle key in the neutral position.
Figure 7:
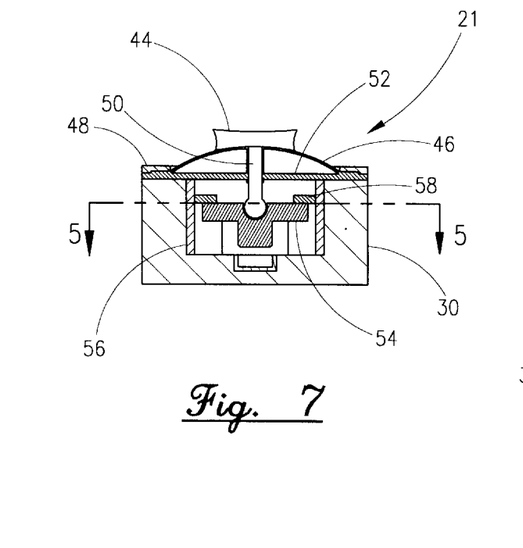
FIG. 7 is a vertical cross section view of the second key embodiment.
Figure 8:
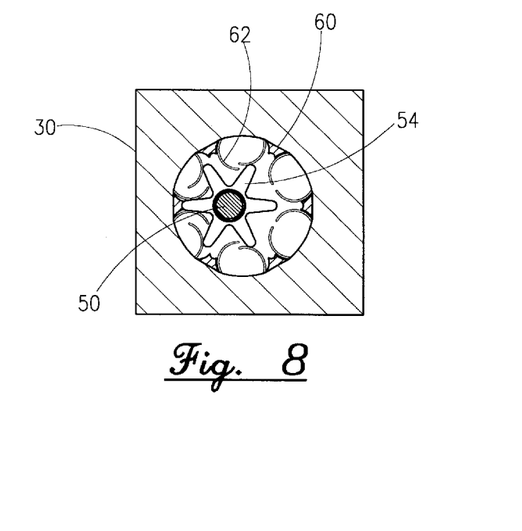
FIG. 8 is a top cross section view taken along sight lines 8—8 in Fig.10.
Figure 9:
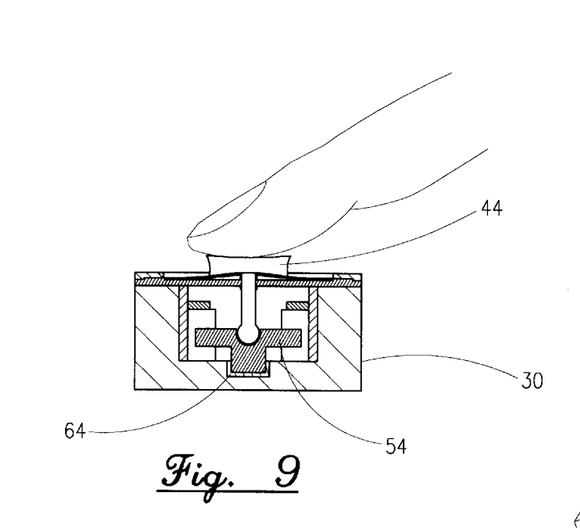
Fig. 9 is a vertical cross section of the second key embodiment with the key centrally depressed.
Figure 10:
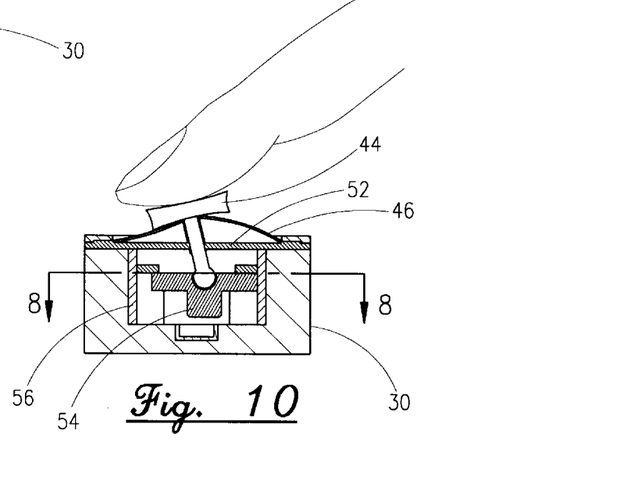
FIG. 10 is a vertical cross section of the second key embodiment in the position shown in FIG. 8.

A second key embodiment 21, first illustrated in FIG. 7, replaces the oval toggle grouping illustrated in FIG. 1 with a novel toggle comprised of a single finger key pad 44 supported by a spherical spring plate 46 captured by rim 48; a conductive stem 50 attached to key 44, extending through and attached to a conductive layer 52 and further pivotally attached to a conductive star member 54, which is held in a neutral central position as seen in FIG. 5 and 7 due to the flexible membrane 52 and spherical spring plate 46 and held in vertical suspension inside a conductive cup 56 by a ledge 58. The cup 56 is further fitted with six contacts radially oriented around its inside wall and a pair of non-conductive, leaf springs 62, as seen in FIG. 8 arranged between each contact in manner which tends to repel the star member 54 away from the contacts 60. Therefore, toggling the key 44 in any of six directions displaces the star member 54 in a manner whereby one of the star's six arms is projected between a pair of springs 62, thus making contact with only one of the six conductive contacts as seen in FIG. 8. Therefore, with the stem 50 and the star member 54 in conductive contact with the conductive circuit board 52, selective contact can be achieved with any of the contacts 60 by directional movement of the key by the user's finger tip as seen in FIG. 10. A seventh position is achieved by depression of the key 44 as seen in FIG. 9, whereby the star member 54 is forced into contact with a conductive socket 64 in the base layer 30.

Figure 11:
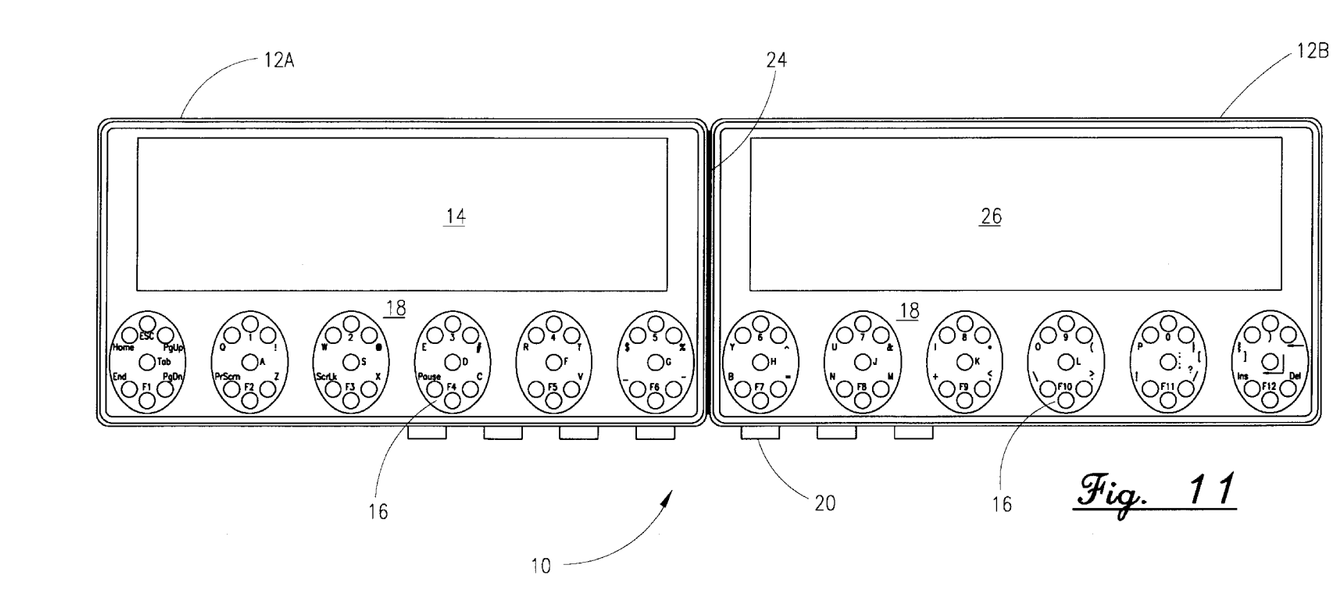
FIG. 11 is a top view of the first embodiment illustrated in FIG. 1.
Figure 12:
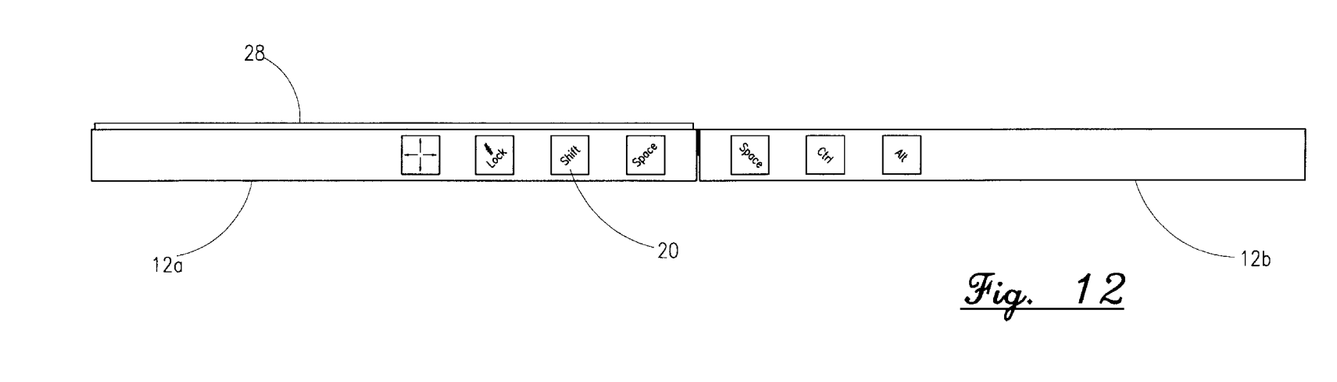
FIG. 12 is a vertical elevation, side view of FIG. 11.
Figure 13:
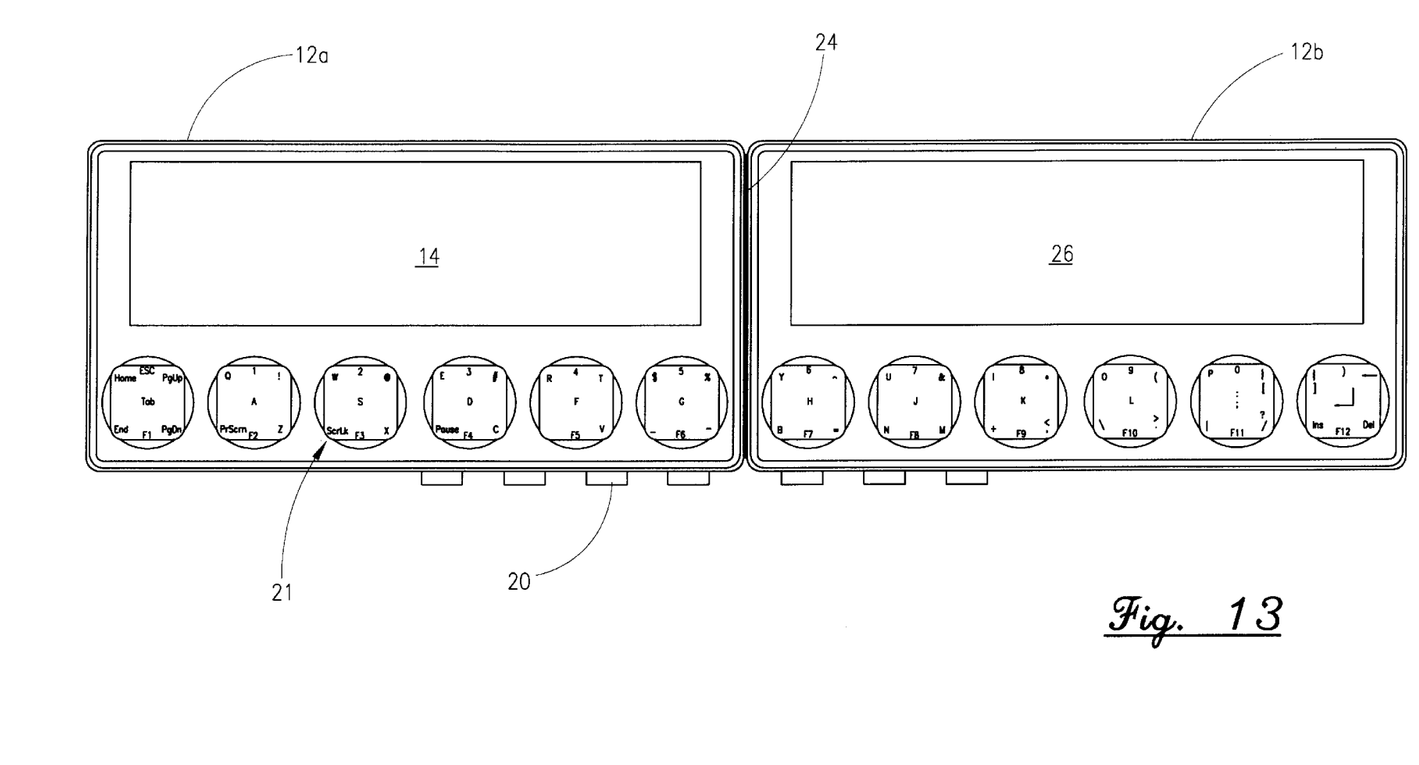
FIG. 13 is a top view of the second key embodiment.

The keyboard's key functions are illustrated in FIG. 11 through 13. The keys 16 in FIG. 11 are arranged with six keys on the face of each foldable section, designated herein as the left hand board 12a and the right hand board 12b. The central four keys 16 labeled a,s,d,f, correspond to the home keys on most QWERTY format keyboards and are spaced accordingly for operation by the user's left hand. The key 16 to the right of the "F" key is designated as "G" and again corresponds to that of the QWERTY keyboard and is also operated by the user's forefinger. The key 16 located to the left of the "A" key is designated as the "Tab" key and is also operated by the user's little finger. Each of these keys have six additional functions corresponding to the keys located above and below the home keys, as well as other specialty keys located on QWERTY typing keyboard. The six keys located on the right hand board 12b correspond to the keys normally operated by the user's right hand in the QWERTY format keyboard. A unique difference is the location of keys 20 along the edge of each keyboard. A space key is provided on each board thus allowing the spacing operation to be performed by the thumb of either hand. Additional specialty keys, such as Shift, Control, Alternate, Shift Lock and Arrow keys, are also provided for operation by the user's thumbs.

Figure 14:
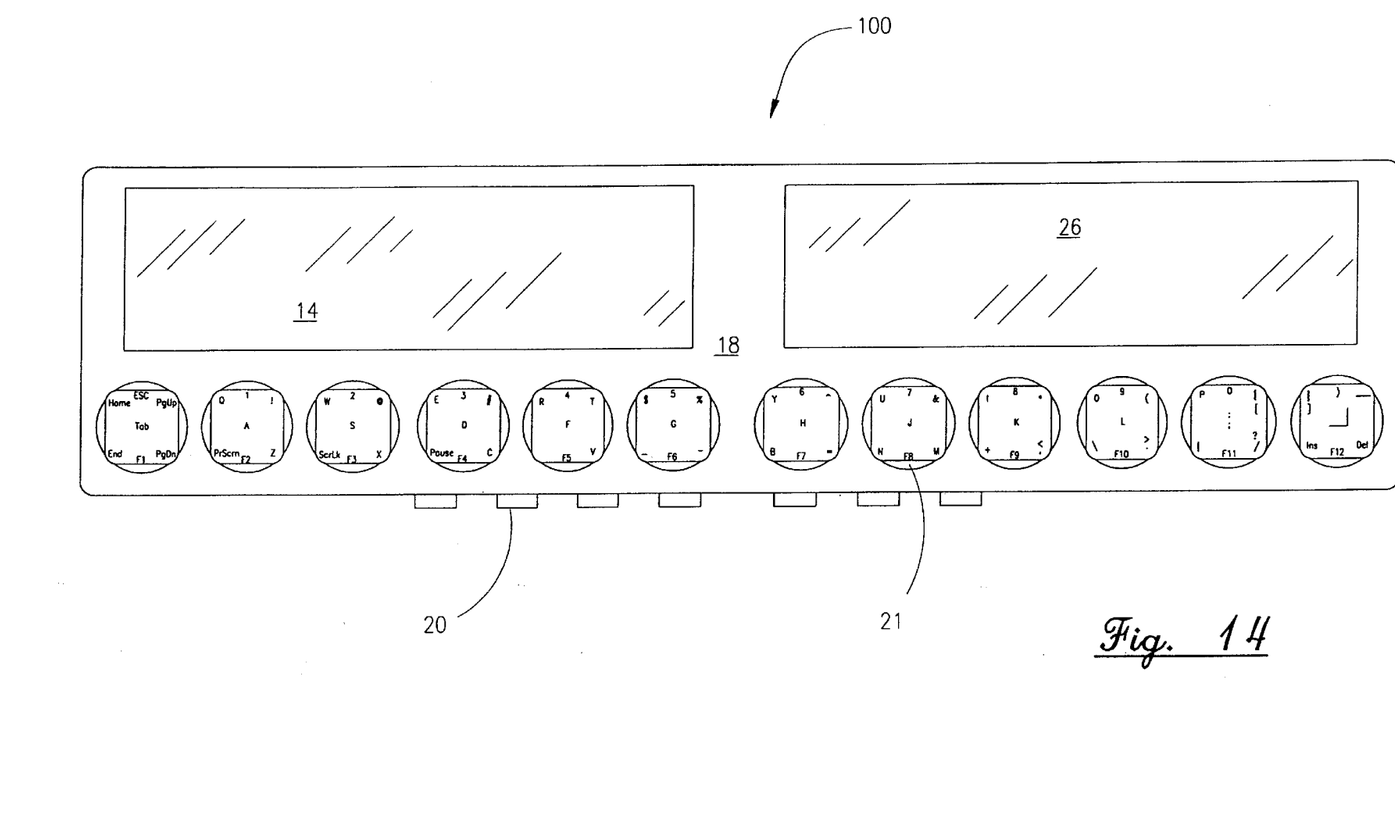
FIG. 14 is a top view of the second key embodiment with no hinge.
Figure 15:
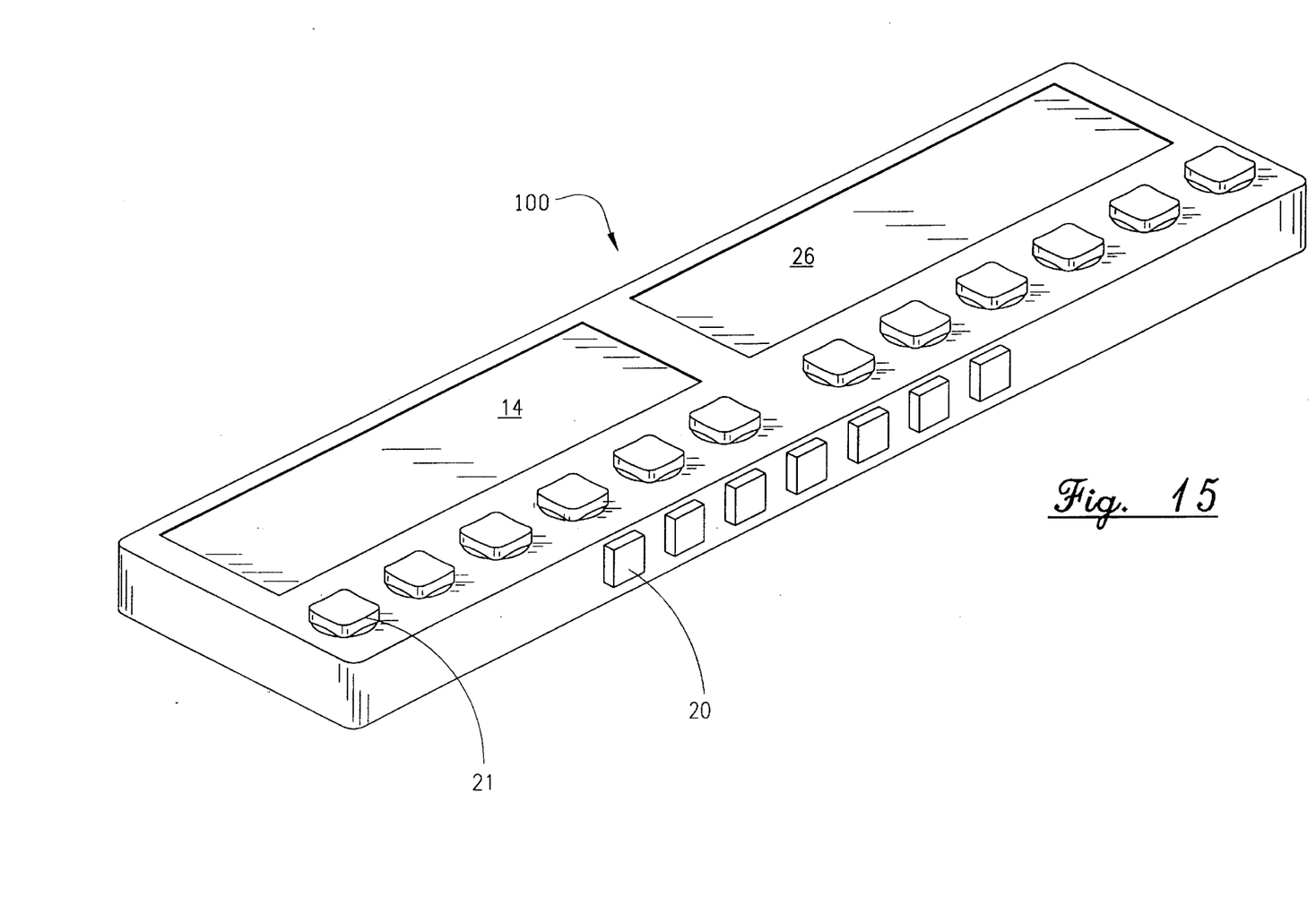
FIG. 15 is a an isometric view of the second key embodiment with no hinge.

It should also be noted that the keyboard arrangements for both the first and second key embodiments may be provided as a small desk model 100 by simply deleting the hinge 24 as depicted in FIGS. 14 and 15.

Because many varying and different embodiments may be made within the scope of the inventive concept herein taught and because many modifications may be made in the embodiments herein detailed in accordance with the descriptive requirement of the law, it is to be understood that the details herein are to be interpreted as illustrative and not intended to limit the invention.

What is claimed is:

1. A portable, word processor, key and keyboard arrangement comprising the combination of:

a) a portable word processor microcomputer having first and second keyboard portions, said keyboard portions being hinged and electrically connected for folding one over the other, at least one of said portions containing a display screen;

b) a single row of multifunctional, toggle keys located on an inner face of each said first and second portions, said toggle keys having a distance between adjacent keys sufficient to permit unhindered, tactile operation by an operator's finger, each of said keys having a plurality of switching elements, and a means connected thereto to produce a different, distinguishable functional response to displacement of said toggle key by an operator's finger, corresponding to each of said switching elements, said single row of multifunctional, keys comprises six keys on each of said first and second portions, each key having manual means for selectively activating up to seven functions; and c) a plurality of thumb keys arranged linearly along a vertical side of said first and second portions adjacent said multifunctional keys in a manner sufficient to permit unhindered operation by an operator's thumbs when the operator's fingers are in contact with said multifunctional toggle keys, said multifunction, keys are comprised of:
   i) a first, polymeric layer having a plurality of conductive toggle pins extending perpendicularly through said layer, said toggle pins having heads projecting above said layer;
   ii) a second, polymeric, layer overlaying said heads secured to said first polymeric layer;
   iii) a conductive material layer pierced by and in sliding contact with said toggle pins, located adjacent said first polymeric layer opposite said pin heads;
   iv) a non-conductive material layer pierced by said toggle pins adjacent said third conductive material layer; and
   v) a printed circuit board layer having sockets therein for receiving said toggle pins, located adjacent said non-conductive layer.

2. A portable, word processor, key and keyboard arrangement according to claim 1 wherein said toggle pins are arranged in an elliptical configuration having three toggle pins in a semicircle clustered near each end of said configuration and a depression pin located at the center of said elliptical configuration.

3. A portable, word processor, key and keyboard arrangement according to claim 2 wherein said toggle pins are pivotal about said conductive material layer, and make contact between said conductive material layer and said sockets as a result of toggling said pins.

4. A portable, word processor, key and keyboard arrangement according to claim 3 wherein at least one said toggle pin is fitted with an insulting ring thereby preventing toggling.

5. A portable, word processor, key and keyboard arrangement according to claim 4 wherein said toggle pin is fitted with an insulating ring and makes contact with said socket by a user depressing said toggle pin.

6. A portable, word processor, key and keyboard arrangement according to claim 1 wherein said multifunctional key comprises:

a) a finger key pad having a conductive stem projecting therefrom passing through a spherical spring plate held captive by a rim attached to said keyboard portions, said spring plate supporting said finger key pad;

b) a conductive material layer spanning said spherical spring plate and surrounding said conductive stem, said stem being in sliding contact and pivotal relative to said conductive material layer;

c) a conductive, star shaped member, having at least six points, pivotally attached to said conductive stem;

d) a non-conductive tube having inner and outer walls surrounding said star member, supporting said conductive material layer, said tube further comprising at least six electrical contacts projecting through said tube walls radially oriented around said tube wall in an engaging manner with points of said star shaped member;

e) a pair of non-conductive, leaf springs arranged between each electrical contact in a manner which tends to avoid accidental contact by repelling said star member away from said electrical contacts; and f) a conductive cup centrally located below said tube directly below said star member for receiving a portion of said star member when said key is depressed.

7. A compact portable, word processor key and keyboard arrangement comprising the combination of:

a) a word processing, microcomputer having a keyboard and a display screen; and b) a single row of twelve, multifunctional, toggle keys, located on a face of said keyboard, said toggle keys having a distance between adjacent keys sufficient to permit unhindered, tactile operation by an operator's finger, each of said keys having a plurality of switching elements, and a means connected thereto to produce a different distinguishable functional response to tactile displacement of said switching elements by an operator's finger tips; and a plurality of thumb keys arranged linearly along a vertical side of said keyboard adjacent said multifunctional keys in a manner sufficient to permit unhindered operation by an operator's thumbs when the operator's fingers are in contact with said multifunctional toggle keys, said multifunctional keys comprising:

a) a first, polymeric layer having a plurality of conductive toggle pins extending perpendicularly through said layer said toggle pins having heads projecting above said layer;

b) a second, polymeric layer overlaying said heads secured to said first polymeric layer;

c) a conductive material layer pierced by and in sliding contact with said toggle pins, located adjacent said first polymeric layer opposite said pin heads;

d) a non-conductive material layer pierced by said toggle pins adjacent to said third conductive material layer; and e) a printed, circuit-board layer having conductive sockets therein for receiving said toggle pins, located adjacent to said nonconductive layer.

8. A compact, portable, word processor key and keyboard arrangement according to claim 7 wherein said toggle pins are arranged in an elliptical configuration having at least three toggle pins clustered in a semicircle near each end of said configuration and a depression pin located at the approximate center of said elliptical configuration.

9. A compact, portable, word processor key and keyboard arrangement according to claim 8 wherein said toggle pins are pivotal about said conductive material layer, and make contact between said conductive material layer and said conductive sockets as a result of toggling said pins.

10. A compact, portable, word processor key and keyboard arrangement according to claim 9 wherein at least one said toggle pin is fitted with an insulating ring thereby preventing toggling.

11. A compact, portable, word processor key and keyboard arrangement according to claim 10 wherein said toggle pin fitted with an insulting ring makes contact with said socket by a user depressing said toggle pin.

12. A compact portable, word processor key and keyboard arrangement comprising the combination of:

a) a portable word processing, microcomputer having a self-contained keyboard and a display screen integral with said keyboard; and b) a single row of twelve, multifunctional toggle keys capable of performing all the functions of a QWERTY type computer key board including the function keys and number pad in a single mode, located on a face of said keyboard, said toggle keys having a distance between adjacent keys sufficient to permit unhindered, tactile operation by an operator's finger, each of said keys having a plurality of switching elements having up to nine functions, and a means connected thereto to produce a different distinguishable functional response to tactile displacement of said switching elements by an operator's finger tips; and a plurality of thumb keys arranged linearly along a vertical side of said keyboard adjacent said multifunctional keys in a manner sufficient to permit unhindered operation by an operator's thumbs when the operator's fingers are in contact with said multifunctional toggle keys.

13. A compact, portable word processor, key and keyboard arrangement according to claim 7 wherein said multifunctional key comprises:

a) a finger key pad having a conductive stem projecting therefrom passing through a spherical spring plate held captive by a rim attached to said keyboard portions, said spring plate supporting said finger key pad;

b) a conductive material layer spanning said spherical spring plate and surrounding said conductive stem, said stem being in sliding contact and pivotal relative to said conductive material layer;

c) a conductive, star shaped member, having at least six points, pivotally attached to said conductive stem;

d) a non-conductive tube having inner and outer walls surrounding said star member, supporting said conductive material layer, said tube further comprising at least six electrical contacts projecting through said tube walls radially oriented around said tube wall in an engaging manner with points of said star shaped member;

e) a pair of non-conductive, leaf springs arranged between each electrical contact in a manner which tends to avoid accidental contact by repelling said star member away from said electrical contacts; and f) a conductive cup centrally located below said tube directly below said star member for receiving a portion of said star member when said key is depressed.

14. A foldable, portable, pocket, word processor comprising:

a) a folding, portable, pocket computer having integral keyboards and display screen;

b) a single row of six keys arranged on each of two similar said keyboards which are hinged and electrically connected together for folding one over the other, said keys having a distance between adjacent keys equivalent to the natural spacing on a user's hand;

c) a means for toggling each of said keys tactilely in six directions relative to a center position and a means to produce a different distinguishable letter or numeric function in response to toggle movements of said keys in each of said six directions;

d) a means for activating a seventh function on each of said keys by depression of said keys; and e) a single row of at least three keys located perpendicularly along an edge parallel and adjacent to said means for toggling said keys.

15. A method for entering data into a compact, portable, pocket type word processor computer comprising the steps of a) manipulating a set of toggle keys on said portable pocket type word processing computer having an integral keyboard portion comprising a single row of twelve toggle keys, on a face of said keyboard portion, arranged to correspond to the finger spacing on each of a user's hands, each of said twelve keys having seven functions operated tactilely by each of said user's finger tips and wherein six of said twelve keys are operated with the fingers tips of each hand; and b) manipulating, with the user's thumbs, a single row of keys, located along a vertical edge of said keyboard parallel and adjacent to said twelve keys, operable with the fingers tips of each hand placed on said twelve keys.

16. A method for entering data into a compact, portable word processor computer comprising the steps of:

a) unfolding a pocket size, micro, word processing computer having a self contained keyboard and integral display screen;

b) manipulating tactilely, a single row of six toggle keys, arranged on each of two hinged and electrically connected similar keyboard portions of said computer, with the fingers tips of each hand, said computer comprising a display screen integral with one said keyboard portion, each of said six keys having seven functions operated tactilely by each of a user's finger tips; and c) manipulating, with a user's thumbs, a single row of keys located vertically along an edge of said keyboard portions, adjacent to each of said six keys.

* * * * *